W. J. PERRITT.
GATE.
APPLICATION FILED JUNE 7, 1909.
964,545.
Patented July 19, 1910.
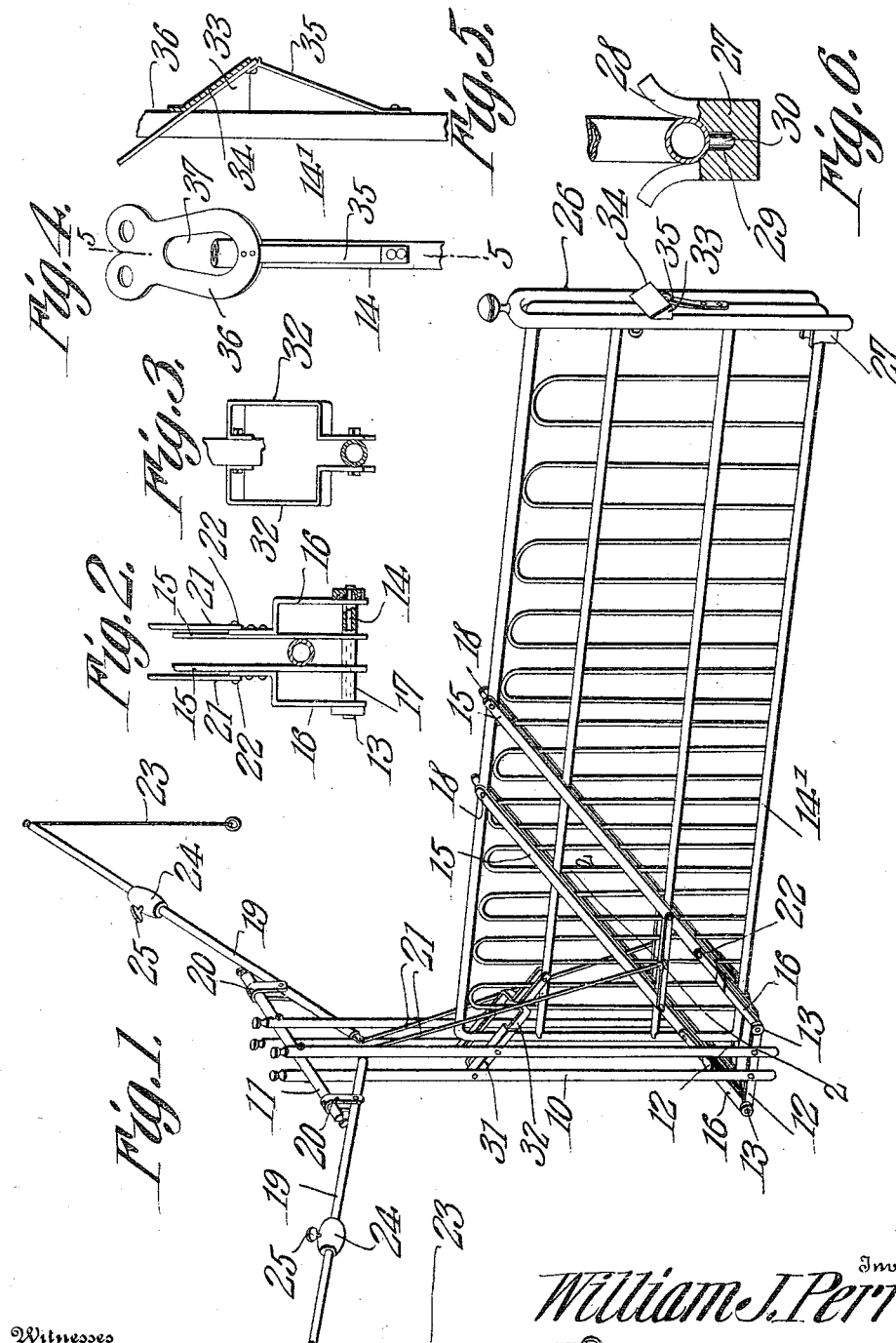
William J. Perritt, Inventor

UNITED STATES PATENT OFFICE.

WILLIAM J. PERRITT, OF ROGERS, ARKANSAS.

GATE.

964,545.  Specification of Letters Patent.  Patented July 19, 1910.

Application filed June 7, 1909. Serial No. 500,531.

*To all whom it may concern:*

Be it known that I, WILLIAM J. PERRITT, a citizen of the United States, residing at Rogers, in the county of Benton and State of Arkansas, have invented a new and useful Gate, of which the following is a specification.

It is the object of the present invention to provide an improved construction of gate and the invention relates more specifically to that class of gates which are designed to be opened from a distance. While such gates ordinarily embody latches, such latches are usually not of such construction as to prevent lifting of the gate, by the rooting of an animal.

It is therefore the object of the present invention to provide means for preventing such movement of the gate.

The means embodied in the present invention for accomplishing the result mentioned above is not in the form of a latch but in the nature of a stop which is carried by one or both of the gate posts and beneath which engages a member carried by the gate whereby such upward movement of the gate will be prevented.

The invention also embodies means for preventing direct backward or lateral movement of the gate and also for bracing or holding its lower portion firmly against movement whereby an animal will be prevented from forcing its way between the gate and one of the gate posts.

In the accompanying drawings, Figure 1 is a perspective view of a gate constructed in accordance with the present invention. Fig. 2 is a sectional view on the line 2—2 of Fig. 1. Fig. 3 is a rear elevation in detail of a portion of the gate. Fig. 4 is a similar view of another portion of the gate. Fig. 5 is a vertical sectional view in detail on the line 5—5 of Fig. 4, and Fig. 6 is a transverse sectional view showing the block for receiving one lower corner of the gate when in closed position.

In the drawings, the gate is illustrated as supported primarily from uprights which are indicated by the numeral 10 and are arranged in spaced pairs, they being connected at their upper ends through the medium of a connecting rod 11 disposed between the uprights of each pair and bolted or otherwise secured in place, the ends of this rod projecting to each side beyond the said pairs of uprights. Secured to the uprights of both pairs, adjacent their lower ends, are bars or plates 12 having bearings 13 in which are journaled the ends of parallel shafts 14, these bearings being preferably provided with ball races to receive bearing balls whereby to render the shafts 14 easy to rotate.

The gate proper is indicated by the numeral 14' and is of any desired construction, it preferably including however a rectangular outer or body frame which may be made of tubing or of solid material as may be desired. In order to support the gate for movement from open to closed position and vice versa, between the pairs of uprights 10, there is provided means which will now be described.

A pair of arms 15 are secured at their lower ends to each of the shafts 14 and secured upon each arm adjacent its lower end, is an off-set bracket or brace 16 which has a downwardly extending portion running parallel to the respective arm and secured at its lower end also to the shaft 14. Spacing sleeves 17 are interposed one between each of the arms of each pair and also one between each arm and the adjacent bracket or brace 16. Inasmuch as the shafts 14 are parallel, it will be readily understood that the two pairs of arms 15 may assume parallel positions with respect to each other and may swing about their respective shafts 14 as centers and maintain their parallelism. The gate 14' is disposed between the arms of the two pairs 15 and pivot bolts 18 are passed through the upper ends of the arms of each pair and the upper or top bar of the outer or body frame of the gate, it being understood that the gate is in this manner supported by the arms 15 and between the same and that upon swinging the arms from the position shown in Fig. 1 of the drawings, for example, to a position in which they will extend substantially at right angles to the position shown, the gate 14' will be carried upwardly and in the direction of the uprights, between these uprights, and to position to the other side of the uprights to that at which it is illustrated as having, in the drawings.

In order that the arms 15 may be rocked so as to shift the gate from open to closed position and vice versa, there are provided levers 19 each one of which is suspended, by means of a suitable clip 20, from each end of the rod 11, the levers having their inner ends projecting toward each other and between the uprights of the pairs 10 as is clearly shown in Fig. 1 of the drawings. Connected to the said inner ends of the levers at their upper ends are connecting cables or rods 21 which at their lower ends are pivoted as at 22 to a cross bar pivotally connecting the arms 15. At their outer ends, each of the arms 19 has secured to it the upper end of a pull rope 23 by means of which they may be rocked in the clip 20 to exert an upward pull upon the arms to which the connecting rods or cables 21 are connected. A counter-balancing weight 24 is slidably mounted upon each arm 19 and is held at adjustment by means of a suitable set screw 25 and by adjusting these counter-weights upon the respective lever arms 19, as will be readily understood, the weight of the gate may be counter-balanced or nearly so, so that but little exertion will be required to be exerted upon the pull ropes 23 to shift the gate.

In addition to the uprights 10, there is provided a gate post with which the gate coöperates when in closed position and this gate post is illustrated as of inverted U form and is indicated by the numeral 26, the forward end of the gate being received between the spaced portions of this post when the gate is in closed position as is clearly shown in Fig. 1 of the drawings. In order to support the said end of the gate when in the position stated and to firmly hold the same against movement in the direction of extent of the gate or movement in other directions, such movement being caused by animals attempting to pass through the gate, there is provided a block 27 which is secured between the spaced portions of the post 26 at the lower end thereof and is recessed as at 28 to receive the lower corner of the gate at the said forward end as is shown in section in Fig. 6 of the drawings. This block 27 is further formed with a socket 29 which opens into the recess 28 and in which seats a stud 30 which is formed or fixed upon the gate at said lower forward corner, this reception of the stud in the socket being had when the gate is fully closed. Preferably, the walls of the recess 28 are outwardly flared as shown in Fig. 6 whereby to insure of proper seating of the corner of the gate in the said recess provided for this purpose.

As heretofore stated, means is provided for opposing direct upward movement of the gate and this means is embodied in members which are carried by the gate posts or uprights 10 and 26 and members which are carried by the gate and are engaged beneath the post-carried members. Secured upon the uprights 10 of each pair in inclined position, is an angle bar 31 and these angle bars have opposed wings as is clearly shown in Fig. 1 of the drawings. Secured upon the gate 14', in inclined position, are frames 32 portions of which are off-set with respect to the gate and are designed to engage beneath the opposing wings of the angle bars 31 upon the uprights 10 when the gate is in closed position, as is clearly shown in Fig. 1 of the drawings whereby to frictionally oppose direct upward movement of this end of the gate. A stop member having attaching wings 33 and a connecting web 34 is secured at the edges of its said attaching wings to the spaced portions of the post 26 with the web 34 extending across the space between these portions. The wings 33 are so formed as to force the web 34 in inclined position as shown in Figs. 1 and 5 of the drawings and, in the case of the angle bars 31 just described, the member upon the gate at the forward or outer end thereof is designed to engage beneath the said inclined web portion 34 of the post-carried stop member just mentioned. This member upon the gate is comprised of a leaf spring 35 which is secured at its lower end to the gate frame at the said end thereof and projects upwardly at an angle as shown in Fig. 5 and has secured at its upper end the lower end of a plate 36 formed with an opening 37 through which the said end of the frame passes. The connection had between the plate 36 and leaf spring 35 is such that the said plate will be supported at an angle with respect to the frame of the gate and at such angle as to firmly engage beneath the web portion 34 of the post-carried stop member as shown in Fig. 5 whereby to frictionally oppose direct upward movement of the forward end of the gate.

From the foregoing description of the invention it will be seen that there is provided a gate of the type mentioned which is movable upwardly laterally in the direction of its extent but that direct upward movement, due to the efforts of animals attempting to pass beneath the gate will be frictionally opposed, and it will also be observed that the gate is firmly held against movement to permit of the passage of an animal between the forward end of the gate and the gate post with which this end coöperates.

It is a well known fact that in gates of this class as ordinarily constructed, the necessary looseness in fit of the joints, while only sufficient to permit of proper operation of the gate, is of such degree as to allow of either end of the gate being raised by a small animal attempting to pass beneath the gate and the retaining devices heretofore described are intended primarily to overcome this disadvantage of the loose fitting joints without, however, preventing operation of the gate in the ordinary manner.

What is claimed is:—

1. In a device of the class described, uprights, rocking arms mounted upon one of the uprights, a gate supported between the arms, means connected with the arms whereby they may be rocked to shift the gate from one position to another, a block upon another upright arranged to receive one lower corner of the gate when the same is in closed position, the said block being formed with a socket, and a pin carried by the gate at the said corner and seating in said socket when the gate is in closed position.

2. In a device of the class described, spaced uprights, a gate mounted between the uprights for movement therebetween from one position to another, means operable to so move the gate, angle bars secured in inclined position upon the uprights, and a member carried by the gate and seating beneath the said angle bars and serving by such engagement to frictionally oppose direct vertical movement of the gate.

3. In a device of the class described, spaced uprights, a gate mounted for movement between the uprights; uprights between which one end of the gate is arranged to seat when the gate is in closed position, an inclined plate carried by the last mentioned upright, a leaf spring carried by the said end of the gate and projecting at an angle therefrom, and a plate carried at the end of the spring and seating frictionally beneath the inclined plate upon the said last mentioned uprights.

In testimony that I claim the foregoing as my own, I have hereto affixed my signature in the presence of two witnesses.

WILLIAM J. PERRITT.

Witnesses:
W. F. WEBB,
A. J. PERRITT.